Feb. 9, 1960 S. DOMESHEK 2,924,026
OPTICAL RADAR SIMULATOR
Filed May 26, 1953 2 Sheets-Sheet 2
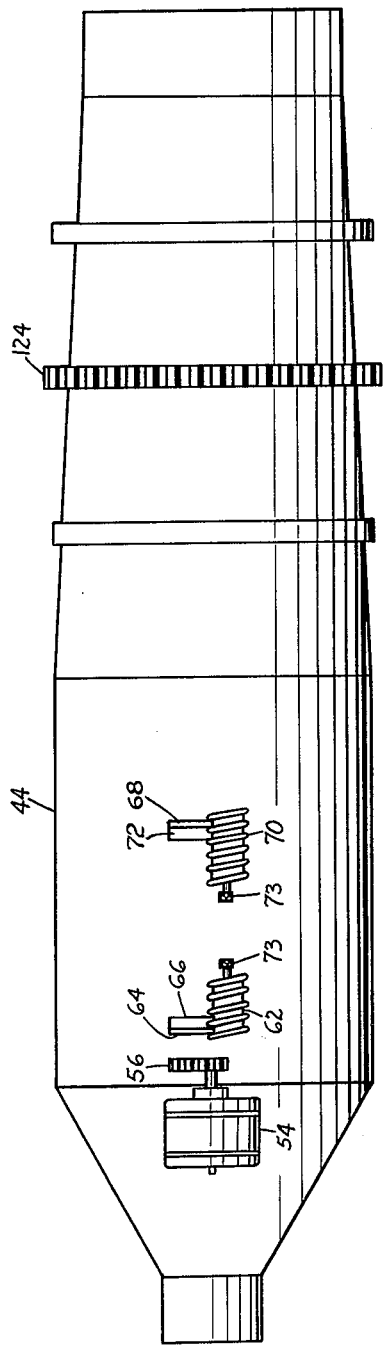
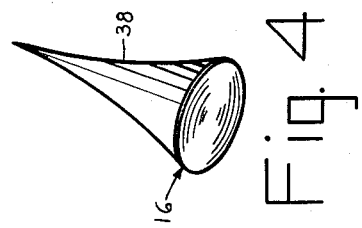
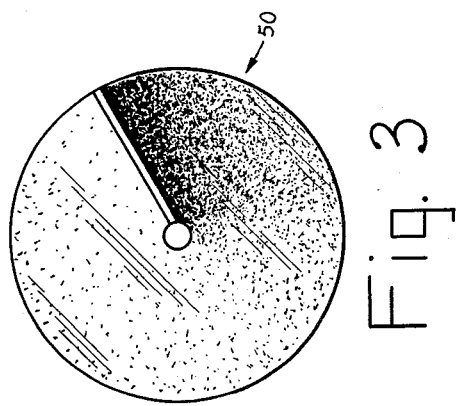
INVENTOR
SOL DOMESHEK
BY
ATTORNEY

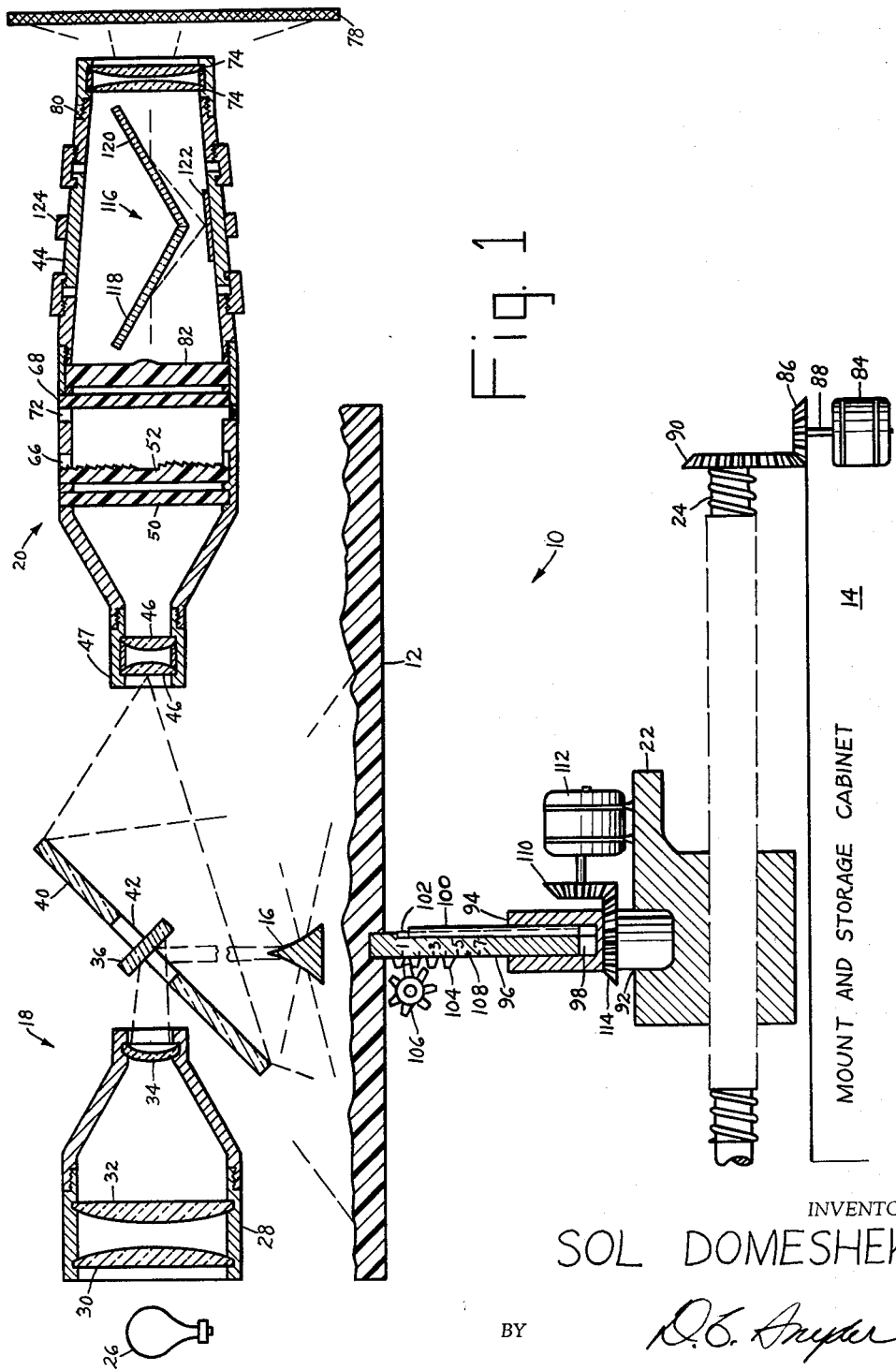

United States Patent Office 2,924,026
Patented Feb. 9, 1960

2,924,026

OPTICAL RADAR SIMULATOR

Sol Domeshek, Great Neck, N.Y.

Application May 26, 1953, Serial No. 357,649

18 Claims. (Cl. 35—10.4)

(Granted under Title 35, U.S. Code (1952), sec. 266)

The invention described herein may be manufactured and used by or for the Government of the United States of America for governmental purposes without the payment of any royalties thereon or therefor.

The invention relates to a radar training device capable of training a number of individuals in radar interpretation and at a low cost.

A primary object of the invention concerns the provision of a radar training device capable of teaching a large number of students at one time with the equipment and instruction maintained at very low costs.

An important feature of the invention resides in the fact that no vacuum tubes are used in the device and therefore, as a corollary advantage, the necessity for an electronic system is obviated.

Another object of the invention resides in synthetically simulating radar observations in the classroom and in avoiding the necessity for carrying out such training only under actual operating conditions, at sea or in the air.

It is a further object of the invention to provide a simple yet rugged trainer that is inexpensive in production and which involves a minimum amount of maintenance.

A further object of the invention resides in the provision of interchangeable elements whereby training in radar interpretation at a wide range of altitudes is possible and the picture obtained can be projected or photographed, as desired.

Another feature of the invention is in the use of an illumination system for the reflector or antenna simulator that does not interfere with the optical projection system.

Yet another feature of the invention resides in the vertical adjustability of the terrain model to simulate radar at both low and high altitudes.

Other objects and many of the attendant advantages of this invention will be readily appreciated as the same becomes better understood by reference to the following detailed description when considered in connection with the accompanying drawings wherein:

Fig. 1 is a vertical section illustrating the optical simulator with certain structures removed for clarity, Fig. 2 is a top plan view of the optical projection system, Fig. 3 is a plan view of the variable density filter and Fig. 4 is a perspective view of the reflector cone.

Fig. 1 illustrates the optical radar simulator and training device and is designed to simulate radar P.P.I. pictures to enable a large number of persons to view the pictures as the same time when used in radar interpretation training. By avoiding use of an electronic system, the costs of production and maintenance are extremely low.

The use of radar, both for the military and civilians, has increased rapidly from its inception, and, as a result, the necessity for men trained in the interpretation of radar signals is increasing. The normal training techniques require taking the students to places of actual use of radar. Some training devices have been substituted, but these rely on electronic systems and are complex as well as costly.

Radar depends for position location or location of objects on the measurements of the time interval between the sending of a burst of radio waves and the return of part of that burst as a reflection from a target. These radio waves can be focused into a beam of energy and the echo obtained is shown on a cathode ray tube at a distance. This image then represents reflected pulse signals obtained by transmitting radio waves from an antenna rotating over a horizontal area. The cathode ray tube screen is calibrated to supply the necessary range and bearing information. All of this is simulated in the invention.

The optical radar simulator 10 comprises a terrain model 12 mounted for movement on a storage cabinet 14, an antenna simulator 16, an illumination system 18 and an optical projection system 20. Terrain model 12 is mounted on cabinet 14 when the device is in use. Cabinet 14 is constructed so that it will receive and store the simulator 10 when the device is not in use. Terrain model 12 is secured to the base in any desired manner and is adapted to move by means of a traveling nut 22 on elongated lead screw 24, as will presently appear.

Antenna simulator or reflector bead 16 is illuminated by a high intensity and very narrow beam of light through illumination system 18. A light source 26 of highly concentrated light is provided. While a zirconium concentrated arc is employed, it is obvious that any suitable light means providing a highly concentrated light may be used. Lens barrel 28 retains a pair of condensing lenses 30 and 32 in spaced relation and an output lens 34. The light from arc 26 is gathered by lens 34 and is directed in a narrow beam to antenna simulator or reflector bead 16. In this way, illuminating apparatus 18 is separate and out of the way of optical projection system 20. A small mirror 36 is placed close to lens 34 at a 45 degree angle to the light emerging from illuminating system 18. Antenna simulator 16 is directly below mirror 36 so that the narrow concentrated beam of light is directed vertically down onto the highly polished exterior surface thereof. As is readily apparent from Fig. 4, reflector 16 is cone shaped with a concave outer surface 38 in order to give, from a vertically incident beam, a spread of light which in vertical cross-section will closely approximate the vertical cross-section of search radar beams. The shape may be modified so that the effects of earth curvature also may be obtained in the beam. In this way, the terrain model does not have to be curved.

The image of lights and shadows cast on terrain model 12 by reflector 16 is collected by a large, front surfaced mirror 40. In order to permit the terrain model 12 to be lighted by the illumination system 18 while directing the terrain model image to the projection system 20, mirror 40 is apertured axially at 42 and mirror 36 extends through such aperture at an angle of 90 degrees to the plane of mirror 40. Mirror 40 is therefore also at an angle of 45 degrees to the datum plane of the model. Thus, the intersection of mirror surfaces 36 and 40 is at the intersection of the vertical of antenna simulator 16.

The image collected by mirror 40 is directed to the optical projection system 20. The axes of all of the elements in optical system 20 are coincident in lens barrel 44. It will be noted that the axis of optical projection system is parallel to the datum plane of model 12 and is also coincident with the axis of illuminating system 18.

The high speed terrain objective lens 46 in a threaded mount 47 collects the image reflected from mirror 40 and projects the image through a rotating variable density filter 50 onto the flat Fresnel lens 52. Filter 50 is a plastic disc and enables the device to more completely resemble the actual radar images obtained by a rotating radar beam. A variable speed motor 54 rotates gear 56 which in turn engages and rotates filter 50 through a suitable slot in lens barrel 44. By constant rotation of filter 50, the simulation of decay and build-up of the terrain images found in operative radar scopes is reproduced, due to the increase in density of the filter with angular advance (see Fig. 3). Speeds of rotation will be varied similar to those of actual and planned radars.

Fresnel lens 52 receives the image cast by the terrain objective lens 46 and modulated by the variable density filter 50, and directs the light through the remainder of the optical system. Lens 52 is of suitable transparent material, such as glass or plastic and is adjustable along its axis by means of screw 62 engaging the perimeter 64 of lens 52. Lens 52 extends slightly through slot 66 on the upper surface of barrel 44 to be engaged by screw 62 for longitudinal adjustment.

Beam spread disc 68 is mounted in barrel 44 spaced from lens 52 and is adjustable longitudinally in relation to the Fresnel lens by means of screw 70 rotatively engaging the perimeter of beam spread disc 68 which extends through slot 72. Beam spread disc 68 is made of any suitable material, and in the illustrated form is a plastic lens of radially oriented cylindrical lenticles. Each point in the object field is imaged by a number of these radially oriented lenticles so that, in the image field, a point is represented by a line. The fact that these lenticles are radially oriented causes this line to be an arc of a circle with the center of the same as that for the radially oriented lenticles. These effects thus provide the visual characteristics of a radar beam sweeping over the target on the PPI scope. Thus, disc 68 has the ability to spread a point object which appears beneath it into an arc parallel to the disc circumference in the same manner that a radar beam spreads a point object in space so that it appears as an arc on the radar scope P.P.I. Further, the amount of spread may be varied by varying the distance between the disc and the image. In the device, such control is obtained by varying the distance between the disc and Fresnel lens 52.

Any desired method for varying the spaces between the several lenses may be used since the means used is merely illustrative. Thus, instead of manual rotation by knob 73, an automatic rotative means may be employed; or, threaded mounts for the lenses may be substituted.

Projection lens 74 is mounted in barrel 44 at the outlet end to project the finally derived radar image onto screen 78 for viewing by a large number of students. The projection lens is longitudinally adjustable with relation to the other lens components such as beam spread disc 68 or Fresnel lens 52 by means of a threaded mount 80. If desired, a still or motion picture camera can be substituted for projection lens 74 to photographically record the simulated radar presentation if it is found expedient to provide prints of a particular radar sequence for distribution for training or operational use.

The optical radar simulator heretofore described is accurate when used for ground or ship radar training. In such instances, the antenna simulator is at the surface of the terrain model and the radar picture obtained corresponds to a surface radar presentation which is not disturbed by slant range. Slant range effect occurs when radar is used in airplanes. Since radar is a distance measuring device, airborne radar measures slant ranges in presenting them all in one plane to ground points and, gives a squeezed appearance to all on the scope face, points relatively in the foreground as compared with points toward the periphery of the scope. To simulate this condition where airborne radar is being demonstrated, slant range introduction lens 82 is removably secured in lens housing 44. Lens 82 is symmetrical about the center, with curved surfaces so as to provide the greatest optical magnification at the center of the field, with progressive decrease in magnification to unity for rays coming from the edge of the field. Thus ground P.P.I is converted to airborne P.P.I. If lens 82 is used, it is preferred that the projection lens be maintained at a fixed distance thereto, as predetermined by the characteristics of the slant range lens.

Actuation of terrain model 12 is illustrated in relation to a polar coordinate system. The drive for this system may be manual or automatic. In the automatic operation of Figure 1, the inputs are obtained from a course and speed generator. The outputs of this generator are in X and Y, which information is converted to $\rho$, $\theta$, in the polar coordinate system.

Referring to Figure 1, motor 84 drives pinion gear 86 through drive shaft 88, pinion 86 in turn rotating pinion 90 keyed to lead screw 24. Rotation of lead screw 24 causes traveling nut 22, carrying the terrain model, to move longitudinally. This provides the $\rho$ component of the motion.

Traveling nut 22 is bored at 92 to receive a freely rotatable sleeve 94. Shaft 96 supports terrain model 12 and extends for vertical adjustment into bore 98 of sleeve 94. Rotation of shaft 96 is prevented by means of key 100 riding in keyway 102 in sleeve 94. Vertical movement of shaft 96 is effected by rack and pinion means 104 and 106. Vertical movement of shaft 96 adjusts the distance between terrain 12 and antenna simulator 16 to provide variations in altitude. Calibrations 108 are supplied to indicate accurately the distance of the antenna simulator from the datum palne of terrain 12 to determine the scale altitude of the antenna simulator 16.

To provide the 2nd component of motion, $\theta$, in the polar coordinate system the X, Y output from the generator is converted to $\rho$, $\theta$ by a resolver and the $\theta$ component is fed via gear 110 actuated by suitable means such as motor 112. Gear 110 actuates pinion 114 mounted on sleeve 94. Thus, the course and speed of the reference factor is obtained.

When the polar coordinate system is used to simulate azimuth stabilized radar, since North is fixed, true bearings are obtained by use of an optical reverter 116 with the optical projection system described above. This reverter may be rotated in a direction opposite to rotation $\theta$, of terrain model 12 and may be therefore used to keep North always at the top of the P.P.I. presentation. However, not all aircraft are equipped with azimuth stabilized radar. In such instances only relative bearing information is obtained by the radar and the bearing of the pips obtained on the scope are relative to the direction of movement which is represented by the top of the scope. Optical reverter 116 in lens barrel 44 comprises a pair of oppositely inclined front surfaced mirrors 118 and 120, whose center points are on the axis of the optical projection system. These mirrors are mounted in any desired manner over a mirror 122 which is substantially parallel to the axis of the optical projection system and to all edges of rectangular mirrors 118 and 120. This mirror assembly is mounted between the slant range and the projection lenses. Mirror 118 reflects the image obtained from terrain model objective lens 46 to plane mirror 122 directly below. Mirror 122 reflects the image to the inclined surface of mirror 120 for projection through lens 74. Gear means 124 on barrel 44 rotates the optical reverter 116 by drive means (not shown) through a rotation in either direction. This rotation may be in a direction opposite to or the same as the rotation of terrain 12. Thus, for azimuth stabilized radars, the reverter will always rotate opposite to the terrain 12. In radars oriented to aircraft heading, the reverter may rotate either way with the terrain depending on the maneuver. The angle of inclination of mirrors 118 and 120 is less than 45 degrees and preferably about 30 degrees. As a result, rotation of the image reverter at 45 degrees inverts the image 90 degrees. The reverter is also used to introduce the effect of yaw or drift due to the wind.

While the device has been described for exemplary purposes with a polar coordinate system, it is obvious other methods of movement may be substituted. For example, where the compactness obtained with the polar coordinate motion is not important, a rectangular coordinate motion may be used. In this instance, two lead screws normal to each other may be provided with one lead screw adapted to carry the terrain model as well as the means to rotate the carriage when relative heading operated radar is employed.

In the operation of the device, terrain model 12 is carried by the vertically adjustable shaft 96 on traveling nut 22. Rotation of lead screw 24 causes nut 22 to move longitudinally and in combination with rotation of shaft 96 and terrain 12 at the same time to simulate the course and speed traveled. Radar antenna simulator 16 is provided with a highly concentrated narrow beam of light from light collimating system 18 which illuminates terrain model 12 which in turn is reflected by mirror 40 through projection system 20. Filter disc 50 rotates to simulate the radar sweep while beam spread disc 68 controls the degree of decrease in resolution of the simulated radar image. In the event high altitude radar training is used, slant range lens 82 is inserted. When the polar coordinate system is used, optical inverter 116 is employed to give either true heading or aircraft oriented radar. Either projection lens 74 is provided to project the image on a screen, or a camera may be substituted to record the image obtained.

Obviously many modifications and variations of the present invention are possible in the light of the above teachings. It is therefore to be understood that within the scope of the appended claims the invention may be practiced otherwise than as specifically described.

What is claimed is:

1. An optical radar simulator comprising, a conical reflector radar antenna simulating means, a narrow beam light source spaced above said radar antenna simulating means, reflecting means adjacent said light source and overlying said antenna simulating means adapted to direct the light to the antenna simulating means, an optical projection system spaced from said radar antenna simulating means and including means to simulate a radar image, model scan area means mounted below said radar antenna simulating means and illuminated by the light directed to and reflected from said antenna simulating means, mean to transfer an image from the scan area means to the optical projection system to be converted into a radar image, and means to move the model scan area means to simulate motion of an air or ground conveyance with respect to the scan area.

2. An optical radar simulator comprising a terrain model, means actuating said model, a light reflecting radar antenna simulator mounted above said model, a source of light mounted above said antenna simulator, illuminating means for light rays comprising a lens barrel, a diverging lens secured in said lens barrel, condensing lenses in said barrel collecting the light rays and emitting them as a narrow beam of light through the diverging lens, reflecting means axially aligned with said illuminating means and directing the light to the antenna simulator for the illumination of said terrain model, an optical projection system aligned with said illuminating means and including means to produce a radar image and means to direct the terrain model image through the optical system for simulation of the radar image.

3. The combination of claim 2 wherein said reflecting means comprises a mirror mounted at an angle of 45 degrees to direct the light from the illuminating means to the antenna simulator.

4. The combination of claim 3 wherein the antenna simulator comprises a cone including a curved outer surface.

5. The combination of claim 4 wherein the light source is a zirconium arc.

6. An optical radar simulator in combination with a terrain model comprising, a conical reflector radar antenna simulating means mounted above said model, a narrow beam light source spaced from said radar antenna simulating means, an optical projection system including means to simulate a radar image, spaced from said radar antenna simulating means and aligned with the light source, and reflecting means secured between said light source and optical system and axially spaced from said antenna simulator to direct light thereto and to transfer a reflected image from said terrain model through the optical system.

7. The simulator of claim 6 wherein said reflecting means comprises an image reflecting mirror, an axial aperture in said mirror, and a light reflecting mirror extending through said aperture, the planes of the mirrors being normal to each other and intersecting in a line disposed substantially in a plane containing the axis of said conical reflector radar antenna simulating means.

8. An optical radar simulator in combination with a terrain model comprising, light reflecting radar antenna simulating means mounted above said model, a narrow beam light source spaced from said radar antenna simulating means, an optical projection system including means to simulate a radar image, spaced from said radar antenna simulating means and aligned with the light source, and reflecting means secured between said light source and optical system to direct light to the radar antenna simulator for illuminating said model and to transfer a reflected image from said terrain model through the optical system, said optical system comprising a lens barrel, a terrain objective lens mounted therein collecting the reflecting image, said means to simulate a radar including a variable density filter spaced from said objective lens, means engaging said variable density filter for rotation, a beam spread lens mounted in said barrel and spaced from said terrain objective lens, and a projection lens mounted in said barrel to project the radar simulated image onto a screen.

9. An optical radar simulator in combination with a terrain model comprising, light reflecting radar antenna simulating means mounted above said model, a narrow beam light source spaced from said radar antenna simulating means, an optical projection system including means to simulate a radar image spaced from said radar antenna simulating means and aligned with the light source, and reflecting means secured between said light source and optical system to direct light to the radar antenna simulator for illuminating said model and to transfer a reflected image from said terrain model through the optical system, said optical system comprising a lens barrel, a terrain objective lens mounted therein collecting the reflected image, said means to simulate a radar image including a variable density filter rotatably mounted in said barrel in spaced relation to said objective lens, a beam spread lens mounted in said lens barrel and spaced from said terrain objective lens, means to longitudinally adjust the last named lens, a projection lens mounted in said barrel for projection onto a screen and a slant range lens fixedly mounted in said barrel between the projection lens and the beam spread lens to simulate a radar image taken from an elevation.

10. The combination of claim 9 wherein a flat Fresnel lens to transmit the maximum of light through the system is mounted between said filter and beam spread lens.

11. An optical radar simulator in combination with a terrain model comprising, light reflecting radar antenna simulating means mounted above said model, a narrow beam light source spaced from said radar antenna simulating means, an optical projection system, including means to simulate a radar image, spaced from said radar antenna simulating means and aligned with the light source, and reflecting means secured between said light source and optical system to direct light to the radar antenna simulator for illuminating said model and to transfer a reflected image from said terrain model through the optical system, said optical system comprising a lens barrel, a terrain objective lens collecting the reflected image mounted therein, said means to simulate a radar image including a variable density filter rotatably mounted in said barrel in spaced relation to said objective lens, a beam spread lens mounted in said lens barrel and spaced from said terrain objective lens, means to longitudinally adjust said last named lens, a projection lens mounted in said barrel in spaced relation to said beam spread lens to project the simulated radar image, and optical reverter means rotatably mounted in said barrel to provide true bearings.

12. The combination of claim 11 wherein said optical reverter comprises a plane mirror mounted in said lens barrel and a pair of oppositely angled mirrors secured above said plane mirror.

13. The method of simulating radar comprising, providing a territory scanning surface, placing a radar antenna simulator above said surface, directing a beam of light on the antenna simulator, dispersing light over the territory scanning surface to obtain an image reflecting the image through a simulated rotating radar beam, spreading the image in a radar P.P.I. arc and projecting the image.

14. The method of claim 13 including the step of simulating the squeezed appearance of a radar image obtained from a height above the scanning surface.

15. The method of claim 13 including the step of rotating the image as seen on a screen to select either relative heading presentation with respect to reference point or the true heading.

16. An optical radar simulator in combination with a terrain model comprising, light reflecting radar antenna simulating means mounted above said model, a narrow beam light source spaced from said radar antenna simulating means and normal to the axis thereof, an optical projection system spaced from said radar antenna simulating means and aligned with the light source, reflecting means positioned between said optical system and said narrow light beam source and axially disposed with respect to said antenna simulating means comprising an image reflecting mirror, an axial aperture in said mirror, a reflecting mirror extending through said aperture, the planes of the mirrors being normal to each other, said reflecting means transferring a reflected image through the optical system, said optical system comprising a lens barrel, a terrain objective lens mounted therein, a variable density filter rotatably mounted in said barrel in spaced relation to said objective lens, a beam spread lens mounted in said lens barrel and spaced from said filter, means to longitudinally adjust said last named lens, a projection lens mounted in said barrel in spaced relation to said beam spread lens to project the simulated radar image, and optical reverter means rotatably mounted in said barrel between said beam spread lens and projection lens.

17. An optical radar simulator comprising, light reflecting radar antenna simulating means, a narrow beam light source spaced from said radar antenna simulating means and normal to the axis thereof, means to direct the light source to the antenna simulating means, an optical projection system spaced from said radar antenna simulating means and aligned with said light source, model scanning area means below said radar antenna simulating means, said scanning area means being mounted on a shaft, means retaining said shaft for longitudinal movement and means to rotate said shaft independently of said longitudinal movement, said optical system comprising a lens barrel, a terrain objective lens mounted therein, a variable density filter spaced from said objective lens, means to rotate said last variable density filter, a beam spread lens mounted in said barrel spaced from said terrain objective lens, a projection lens mounted in said barrel to project a radar simulated image and a mirror reflecting means to reflect the model area to the optical projection system.

18. An optical light reflecting radar simulator comprising, radar antenna simulating means, a narrow beam light source spaced from said radar antenna simulating means and normal to the axis thereof, means to direct the light source to the antenna simulating means, an optical projection system spaced from said radar antenna simulating means and aligned with said light source, scanning area means below said radar antenna simulating means, said scanning area means being mounted on a shaft, means retaining said shaft for longitudinal movement and means to rotate said shaft independently of said longitudinal movement, said optical system comprising a lens barrel, a terrain objective lens mounted therein, a variable density filter rotatably mounted in said barrel in spaced relation to said objective lens, a beam spread lens mounted in said lens barrel and spaced from said filter, means to longitudinally adjust the last named lens, a projection lens mounted in said barrel and a slant range lens fixedly mounted in said barrel between the projection lens and the beam spread lens to simulate a radar image taken from an elevation and a mirror reflecting means to reflect the model area to the optical projection system.

References Cited in the file of this patent
UNITED STATES PATENTS

| 1,842,855 | Benard | Jan. 26, 1932 |
| 1,934,582 | Bausch et al. | Nov. 7, 1933 |
| 2,283,268 | Kreinin | May 19, 1942 |
| 2,405,591 | Mason | Aug. 13, 1946 |
| 2,438,898 | Campbell | Apr. 6, 1948 |
| 2,443,631 | McDermott | June 22, 1948 |
| 2,470,912 | Best et al. | May 24, 1949 |
| 2,491,308 | Gorton | Dec. 13, 1949 |
| 2,493,770 | Manning | Jan. 10, 1950 |
| 2,501,350 | Odin | Mar. 21, 1950 |
| 2,505,793 | Rust et al. | May 2, 1950 |
| 2,536,718 | Brandon | Jan. 2, 1951 |
| 2,579,177 | Miles | Dec. 18, 1951 |
| 2,662,305 | Alric | Dec. 15, 1953 |

OTHER REFERENCES

Dummer: Aids To Training, The Design Of Radar Synthetic Training Devices For The R.A.F., Proceedings of Institution of Electrical Engineers (a British publication), part 3, March 1949, pages 101 to 112.